US 8,495,188 B2

(12) United States Patent
Matsumoto et al.

(10) Patent No.: US 8,495,188 B2
(45) Date of Patent: Jul. 23, 2013

(54) SENSOR INFORMATION MANAGEMENT SYSTEM, SENSOR INFORMATION MANAGEMENT METHOD, AND COMPUTER-READABLE STORAGE MEDIUM

(75) Inventors: Yasuhide Matsumoto, Kawasaki (JP);
Masatomo Yasaki, Kawasaki (JP);
Masashi Uyama, Kawasaki (JP);
Madoka Mitsuoka, Kawasaki (JP);
Satoru Watanabe, Kawasaki (JP);
Mitsuru Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 942 days.

(21) Appl. No.: 12/049,619

(22) Filed: Mar. 17, 2008

(65) Prior Publication Data

US 2008/0243440 A1    Oct. 2, 2008

(30) Foreign Application Priority Data

Mar. 27, 2007 (JP) ................................. 2007-082142

(51) Int. Cl.
*G06F 15/173* (2006.01)
(52) U.S. Cl.
USPC ............................ 709/223; 709/224; 709/226
(58) Field of Classification Search
USPC .......................................... 709/223, 224, 226
See application file for complete search history.

(56) References Cited

U.S. PATENT DOCUMENTS

| | | | |
|---|---|---|---|
| 7,006,507 B2* | 2/2006 | Sano et al. | 370/400 |
| 7,406,401 B2* | 7/2008 | Ota et al. | 702/188 |
| 7,908,020 B2* | 3/2011 | Pieronek | 700/19 |
| 2004/0249590 A1* | 12/2004 | Ota et al. | 702/79 |
| 2005/0262258 A1 | 11/2005 | Kohno et al. | |

FOREIGN PATENT DOCUMENTS

| | | |
|---|---|---|
| JP | 2001-211443 | 8/2001 |
| JP | 2002-163299 | 6/2002 |
| JP | 2002-281496 | 9/2002 |
| JP | 2004-343592 | 2/2004 |
| JP | 2004-289704 | 10/2004 |
| JP | 2004-363995 | 12/2004 |
| JP | 2005-318411 | 11/2005 |
| JP | 2006-304280 | 11/2006 |

OTHER PUBLICATIONS

Japanese Office Action issued Jun. 21, 2011 in related Japanese Patent Application No. 2007-02142 (2 pages).
Japanese Office Action issued Jan. 31, 2012 in corresponding Japanese Patent Application No. 2007-082142.

* cited by examiner

*Primary Examiner* — Adnan Mirza
(74) *Attorney, Agent, or Firm* — Staas & Halsey LLP

(57) ABSTRACT

A sensor information management system is connected to a network including a plurality of sensors and a computer including a service providing unit for providing services using data presented by at least one of the plurality of sensors. The sensor information management system includes: a sensor profile information record unit for recording sensor profile information; a sensor request information record unit for recording sensor request information; a scenario record unit for recording scenario data; a scenario generation unit for determining an operation for allowing the sensor, and recording the scenario data including the operation; and a scenario management unit for generating a control signal for allowing each sensor and transmitting the generated signal to the each sensor.

9 Claims, 10 Drawing Sheets

SENSOR INFORMATION MANAGEMENT SYSTEM, SENSOR INFORMATION MANAGEMENT METHOD, AND COMPUTER-READABLE STORAGE MEDIUM

CROSS-REFERENCE TO RELATED APPLICATIONS

This application is based upon and claims the benefit of priority from the prior Japanese Patent Application No. 2007-082142, filed on Mar. 27, 2007, the entire contents of which are incorporated herein by reference.

BACKGROUND OF THE INVENTION

1. Technical Field

The present invention relates to a system, a method, and a program for operating a sensor and a service in a network. The system, method, and program may include a plurality of sensors and a computer for providing services using data presented by at least one of the plurality of sensors.

2. Description of the Related Art

Recently, an analysis service has been offered using data provided to a computer by a sensor connected to a network. For example, there is a system for analyzing the paths of customer flows in a plurality of shops using data provided to a computer from cameras mounted in the plurality of shops. Producing such a system requires high operation costs for mounting a sensor, setting a system, performing maintenance, etc.

Conventionally, when a system for offering a new analysis service is produced, it is necessary to mount a new sensor. Thus, a system is disclosed to logically divide a sensor as if it were a plurality of sensors, assign each sensor to a separate process, and operate the entire sensor (for example, Japanese Patent Application Laid-Open No. 2006-304280). The system enables a sensor to be utilized efficiently in a plurality of analysis services.

However, the above-mentioned system has been applied only to a dynamic configuration for efficiently utilizing a sensor. That is, a sensor cannot be efficiently used with a location of each of the plurality of sensors in the entire network through which a plurality of sensors are connected. Nor can the use time period in which each sensor is available, etc. be taken into account.

SUMMARY OF THE INVENTION

The objective of the present invention is to provide a sensor information management system capable of efficiently using data provided by a plurality of sensors in an entire network to which the plurality of sensors are connected.

According to a first aspect of the present invention, a sensor information management system is connected to a network including a plurality of sensors and a computer including a service providing unit for providing services using data presented by at least one of the plurality of sensors. The sensor information management system includes a sensor profile information record unit for recording sensor profile information representing for each of predetermined items the information about each of the plurality of sensors, and a sensor request information record unit for recording sensor request information representing for each of predetermined items. The sensor request information includes data requested from the service providing unit to a sensor to offer the service, a scenario record unit for recording scenario data representing the operation of at least a part of the plurality of sensors, a retrieval unit for extracting data representing a set of a service and a sensor for presenting the data requested to offer the service by comparing at least a part of the items of the sensor profile information recorded in the sensor profile information record unit with a corresponding item of the sensor request information recorded in the sensor request information record unit, a scenario generation unit for determining an operation for allowing the sensor to present the data requested to offer the service with respect to the set of the service and the sensor represented by the data extracted by the retrieval unit based on the sensor profile information and the sensor request information, and recording the scenario data including the operation for representing the operation of the sensor in the scenario record unit, and a scenario management unit for generating a control signal for allowing each sensor to perform the operation of each sensor represented by the scenario data recorded in the scenario record unit, and transmitting the generated signal to the each sensor.

With the above-mentioned configuration, the sensor information management system includes the sensor profile information record unit for recording sensor profile information about each of the plurality of sensors connected to a network, and the sensor request information record unit for recording sensor request information relating to the data requested by the service providing unit for the sensor. Therefore, the retrieval unit can extract the data representing a service and the appropriate sensor for the service by comparing at least a part of the items of the sensor profile information with the corresponding items of the sensor request information about the service. The scenario generation unit determines the operation of the sensor from which information required to offer the service can be obtained with respect to the set represented by the data extracted by the retrieval unit, and records in the scenario record unit the scenario data includes in the determined operation. Therefore, the respective operations of the plurality of sensors can be collectively recorded as scenario data in the scenario record unit. The scenario management unit generates a control signal for allowing each sensor to perform its operation indicated by the scenario data, and transmits the signal to each sensor. Thus, an appropriate sensor can perform an appropriate operation to efficiently present the data required in the service indicated by the sensor request information. That is, the retrieval unit extracts a service and a sensor appropriate for presenting data for the service, and the scenario generation unit determines the appropriate operation of the sensor. Thus, since the determined operations of the respective sensors are collectively recorded as scenario data in the scenario record unit, the scenario management unit can generate a control signal such that each sensor can perform an appropriate operation based on the scenario data, and transmit the signal to each sensor. As a result, data presented by the plurality of sensors can be efficiently used in the entire network to which the plurality of sensors is connected.

According to a second aspect of the present invention, a sensor information management method is a method used in a computer connected to a network including a plurality of sensors and another computer including a service providing unit for providing services using data presented by at least one of the plurality of sensors. The sensor information management method includes the operations of recording in a sensor profile information record unit the information about each of the plurality of sensors as sensor profile information representing each of the predetermined items, recording in a request information record unit the information about data requested from the service providing unit to the sensor, as sensor request information representing each of predetermined items, to offer the service, recording in a scenario record unit the scenario data indicating the operation of at least a part of the plurality of sensors, extracting data indicating a set of a service and a sensor for providing data requested to provide the service by comparing at least a part of items of the sensor profile information recorded in the sensor profile information record unit with a corresponding item in the sensor request information recorded in the sensor request information record unit, determining an operation of the sensor providing data requested to offer the service with respect to the set of the service and the sensor indicated by the extracted data based on the sensor profile information and the sensor request information, recording in the scenario record unit the determined operation of the sensor included in the scenario data, and generating a control signal for allowing each of the sensors to perform an operation of each sensor indicated by the scenario data recorded in the scenario record unit, and transmitting the control signal to each sensor.

According to a third aspect of the present invention, a recording medium for recording a sensor information management program stores a sensor information management program used to direct a computer connected to a plurality of sensors and another computer including a service providing unit for providing services using data presented by at least one of the plurality of sensors to perform the functions of recording in a sensor profile information record unit the information about each of the plurality of sensors as sensor profile information representing each of the predetermined items, recording in a sensor request information record unit the information about data requested from the service providing unit to the sensor, as sensor request information representing each of the predetermined items, to offer the service, and recording in a scenario record unit the scenario data indicating the operation of at least a part of the plurality of sensors, extracting data indicating a set of a service and a sensor for providing data requested to provide the service by comparing at least a part of items of the sensor profile information recorded in the sensor profile information record unit with a corresponding item in the sensor request information recorded in the sensor request information record unit, determining an operation of the sensor providing data requested to offer the service with respect to the set of the service and the sensor indicated by the extracted data based on the sensor profile information and the sensor request information, and recording in the scenario record unit the determined operation of the sensor included in the scenario data, and generating a control signal for allowing each of the sensors to perform an operation of each sensor indicated by the scenario data recorded in the scenario record unit, and transmitting the control signal to each sensor.

The above-described embodiments of the present invention are intended as examples, and all embodiments of the present invention are not limited to including the features described above.

DETAILED DESCRIPTION OF THE PREFERRED EMBODIMENTS

Figure 1:
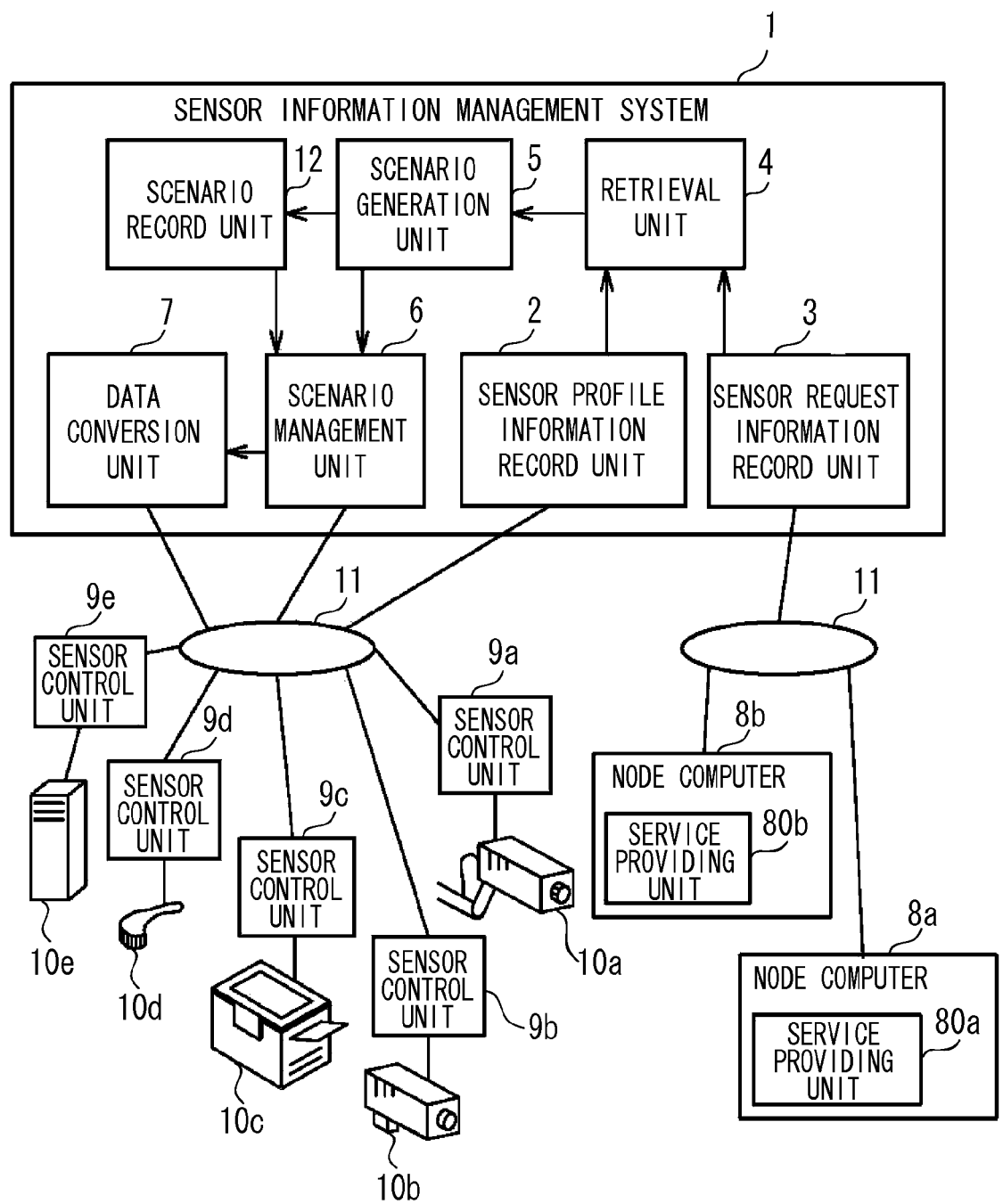
FIG. 1 is a block diagram showing the functions and the configuration of the system including the sensor information management system.

Reference may now be made in detail to embodiments of the present invention, examples of which are illustrated in the accompanying drawings, wherein like reference numerals refer to like elements throughout.

More practical embodiments of the present invention are described below in detail with reference to the attached drawings.

Configuration of Sensor Information Management System

FIG. 1 shows the configuration of the sensor information management system according to an embodiment of the present invention. FIG. 1 practical shows the configuration of the entire system including the sensor information management system. A sensor information management system 1 shown in FIG. 1 is connected to a network 11. The present embodiment is described with a network 11 being the Internet for example. However, the type of network is not limited, but can be a LAN or any other computer network.

Sensors 10*a* to 10*e* including node computers 8*a* and 8*b* and sensor control units 9*a* and 9*b* are connected to the network 11. The node computers 8*a* and 8*b* are respectively provided with service providing units 80*a* and 80*b*. Each of the service providing units 80*a* and 80*b* provides an analysis service by performing information processing using the data provided by at least one of the sensors 10*a* to 10*e*. For example, the service providing unit 80*a* analyzes in real time the image data of a shop A provided by the sensor 10*a*, and performs the process of providing data indicating the tendency of the customers visiting the shop A, thereby offering a service of analyzing the behavior of the customers in the shop A FIG. 1 shows the case in which there are two node computers 8*a* and 8*b* and five sensors 10*a* to 10*e* for simple explanation. However, the number of node computers and sensors connected to the network 11 is optional. Furthermore, the network 11 can also include an optional node computer such as a WWW server, a DNS server, a user terminal, etc. in addition to the sensor information management system 1, the sensors 10*a* to 10*e*, and the node computers 8*a* and 8*b*. These node computers can include a service providing unit for offering a service using a sensor.

The sensors 10*a* to 10*e* detect information about a physical amount (light, pressure, displacement, temperature, humidity, etc.), information about a chemical amount (gas, ion, living substance, etc.), information generated in the information processing (various types of log data, POS register information, communication packet analysis information), etc., and provide the information as a signal available in the subsequent processes. In the present embodiment, for example, the sensors 10a and 10b are video cameras respectively provided for the shops A and B (not shown in the attached drawings), the sensor 10c is a scanner, the sensor 10d is a bar code reader of the register in the shop C (not shown in the attached drawings), and the sensor 10e is a CGM (consumer generated media) sensor for providing reputation information about blogs by analyzing the Web log etc. of a Web server (not shown in the attached drawings).

Thus, a sensor described in the present invention not only detects physical or chemical information and converts the information into a signal convenient for subsequent processing, but also detects various data generated in the information processing of the computer, and converts the information into a signal convenient for subsequent processing. In addition, the sensor can be connected to the network 11 by cable or connected to the network 11 by wireless.

The sensor information management system 1 is a system having the function of efficiently assigning the data provided by the sensors 10a to 10e connected to the network 11 to a service of the service providing units 80a and 80b of the node computers 8a and 8b. The sensor information management system 1 includes a sensor profile information record unit 2, a sensor request information record unit 3, a retrieval unit 4, a scenario generation unit 5, a scenario management unit 6, a data conversion unit 7, and a scenario record unit 12.

The sensor information management system 1 can be configured by, for example, a general-purpose computer such as a personal computer, a server machine, etc. Each component of the retrieval unit 4, the scenario generation unit 5, the scenario management unit 6, and the data conversion unit 7 is realized by the CPU of the computer executing a predetermined program. The sensor information management system 1 uses a part of the record device of the computer or the record device accessible from the computer as the sensor profile information record unit 2, the sensor request information record unit 3, and the scenario record unit 12.

The sensor profile information record unit 2 records the sensor profile information relating to the data provided by each of the sensors 10a to 10e connected to the network 11. The sensor profile information record unit 2 records the information relating to the sensors 10a to 10e for each of the predetermined items such as the information about, for example, the position of a sensor, the time in which the sensor can be used, the data provided by the sensor, other pieces of information about the sensor, etc. An example of the information about the data provided by the sensor can be the information indicating the type, the attribute, etc. of the data provided by the sensor. Thus, the sensor profile information includes the information indicating where, what type of data, and with what specifications the sensor provides.

The sensor profile information about each of the sensors 10a to 10e can be predetermined in the recording medium of the memory etc. of each of the sensors 10a to 10e. When a sensor includes a user interface, the sensor profile information about each of the sensors 10a to 10e can be set based on the input from a user. Additionally, a sensor can automatically obtain the information about the environment, for example, obtain the position information by the GPS function, etc., thereby including the information in the sensor profile information recorded in the sensor.

The sensor profile information recorded in each of the sensors 10a to 10e is transmitted to and recorded in the sensor profile information record unit 2 through the network 11. In this case, in each of the sensors 10a to 10e, it is desired that the information about a sensor is set for each of the predetermined items such as a location, a use time period, the information about provided data, etc. It is not always necessary to set the sensor profile information about each of the sensors 10a to 10e in each of the sensors 10a to 10e. For example, the sensor profile information about each of the sensors 10a to 10e can be set by another terminal (not shown in the attached drawings) connected over the network 11, and transmitted to the sensor profile information record unit 2.

The sensor request information record unit 3 records the sensor request information transmitted from the node computers 8a and 8b. The sensor request information is the data represented for each of the predetermined items about the information relating to the data requested from the service providing units 80a and 80b of the node computers 8a and 8b to the sensor to offer a service. The item of the sensor request information can be, for example, the position of the sensor requested from the service providing units 80a and 80b, the time required by the service providing units 80a and 80b to use the sensor, and the information about the data to be acquired by the service providing units 80a and 80b from the sensor. In addition, it is desired that the sensor request information is recorded for each service offered by the service providing units 80a and 80b. Thus, the sensor request information includes the information indicating the condition relating to the data to be acquired from the sensor.

The sensor request information about each service offered by the service providing units 80a and 80b is generated by, for example, a node computer based on the data input by a user, transmitted to the sensor request information record unit 3, and recorded therein.

Figure 2:
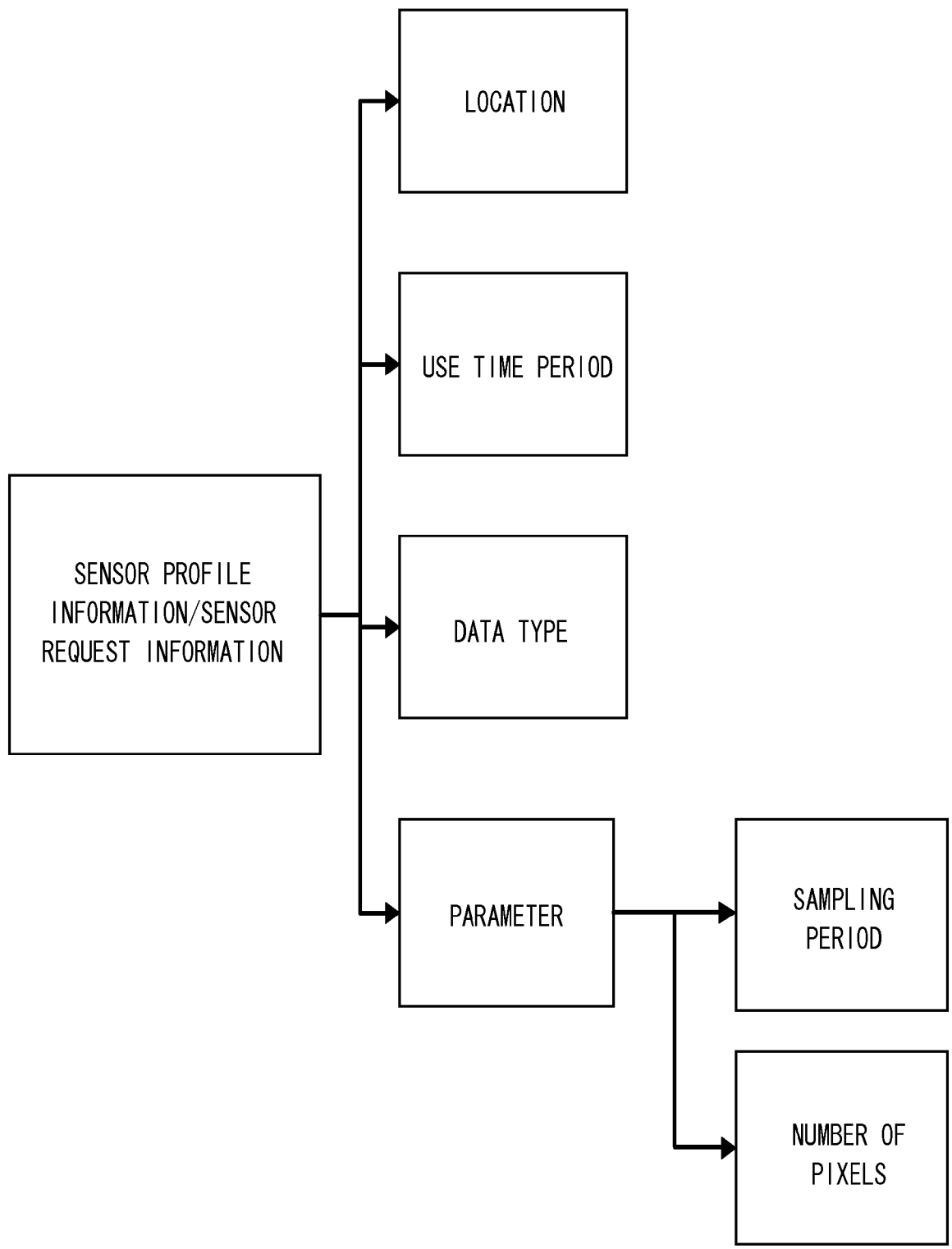
FIG. 2 shows an example of a schema of sensor profile information and sensor request information.

Described below is an example of the data structure of the sensor profile information and the sensor request information. FIG. 2 shows an example of a schema of the sensor profile information about one sensor and the sensor request information about one service.

The schema shown in FIG. 2 is used for both the sensor profile information and the sensor request information. By using similar schemas for the sensor profile information and the sensor request information, the process of the retrieval unit 4 described later can be simplified. In the schema shown in FIG. 2, the sensor profile information/sensor request information has a hierarchical structure. The data of a location, a use time, a data type, and a parameter is included in an underlayer of the structure of the sensor profile information and the sensor request information about one sensor or service.

The location is the information about the site in which a sensor is mounted. The location included in the sensor profile information about one sensor can be data indicating where the sensor is located. The location included in the sensor request information about one service can be data indicating where a sensor is located to offer the service. Practically, the data identifying the shop where the sensor is located, the longitude-latitude data available by the GPS, etc. are recorded as a location.

The use time period is the information about the operation time of the sensor. The use time period included in the sensor profile information about one sensor can be the time in which the sensor is operating, that is, the time in which the sensor is available is recorded as a use time period. The use time period included in the sensor request information about one service can be the time in which the sensor is to be used to offer the service.

The data type is the information about the type of data offered by a sensor. The data type included in the sensor profile information about one sensor can be the information indicating what data is provided from the sensor. The data type included in the sensor request information about one service can be the information indicating what data is to be acquired from the sensor to offer the service. Practically, for example, image information, voice information, entry/exit information, position information, POS register information, Web access frequency, acceleration, pressure, temperature, voltage, current, etc. are recorded as data types.

The parameter is the information indicating the attribute of data provided by a sensor. The information to be recorded as the attribute of data largely depends on the data type. For example, when the data type is image information, the sampling frequency and the number of pixels can be recorded as parameters as shown in FIG. 2. For another example, when the data type is a speed, for example, error precision, a unit (km/h, m/sec), etc. can be recorded. In addition, for example, the information indicating the attribute of the sensor itself such as the identification information (sensor ID) about the sensor can be recorded as a parameter.

As shown in FIG. 2, the data having the schema of a hierarchical structure can be recorded in, for example, an XML format, but the data format is not limited to a specific format. In addition, the schema of the sensor profile information and the sensor request information is not limited to the example above.

The retrieval unit 4 compares the sensor profile information about each of the sensors 10a to 10e recorded in the sensor profile information record unit 2 with the sensor request information about each service offered by the service providing units 80a and 80b recorded in the sensor request information record unit 3 with respect to each item, thereby extracting data indicating a set of a service and a sensor used for offering the service. For example, when the sensor profile information and the sensor request information have the structure shown in FIG. 2, the retrieval unit 4 determines whether or not the sensor profile information about a sensor matches the sensor request information about a service in location, use time period, data type, and parameter. As a result, if the information matches each other in all of the items, the retrieval unit 4 can extract the set of the sensor profile information and the sensor request information. The extracted data is transmitted to the scenario generation unit 5.

Relating to the set of a service and a sensor indicated by the data transmitted from the retrieval unit 4, the scenario generation unit 5 determines the operation of the sensor required to offer the service, includes the operation in the scenario data indicating the operation of the sensor, a and records the result in the scenario record unit 12. At this time, the scenario generation unit 5 can determine the operation of the sensor based on the sensor profile information about the sensor and the sensor request information about the service. The scenario record unit 12 records the scenario data indicating the operation of at least a part of the sensors 10a to 10e through the scenario generation unit 5.

The scenario management unit 6 generates a control signal for allowing each sensor to perform its operation indicated by the scenario data recorded in the scenario record unit 12, and transmits the signal to each sensor. In the present embodiment, the scenario management unit 6 transmits an operation instruction to the sensor control units 9a and 9e respectively provided by the sensors 10a to 10e, thereby operating each of the sensors 10a to 10e according to the scenario data. The scenario data is described later in detail.

As described above, with the system configuration shown in FIG. 1, the sensor information management system 1 functions as a gateway for dynamically coupling the sensors 10a to 10e connected to the network 11 to a service offered by the node computer according to the sensor profile information and the sensor request information.

Example of Operation of Sensor Information Management System 1

Figure 3:
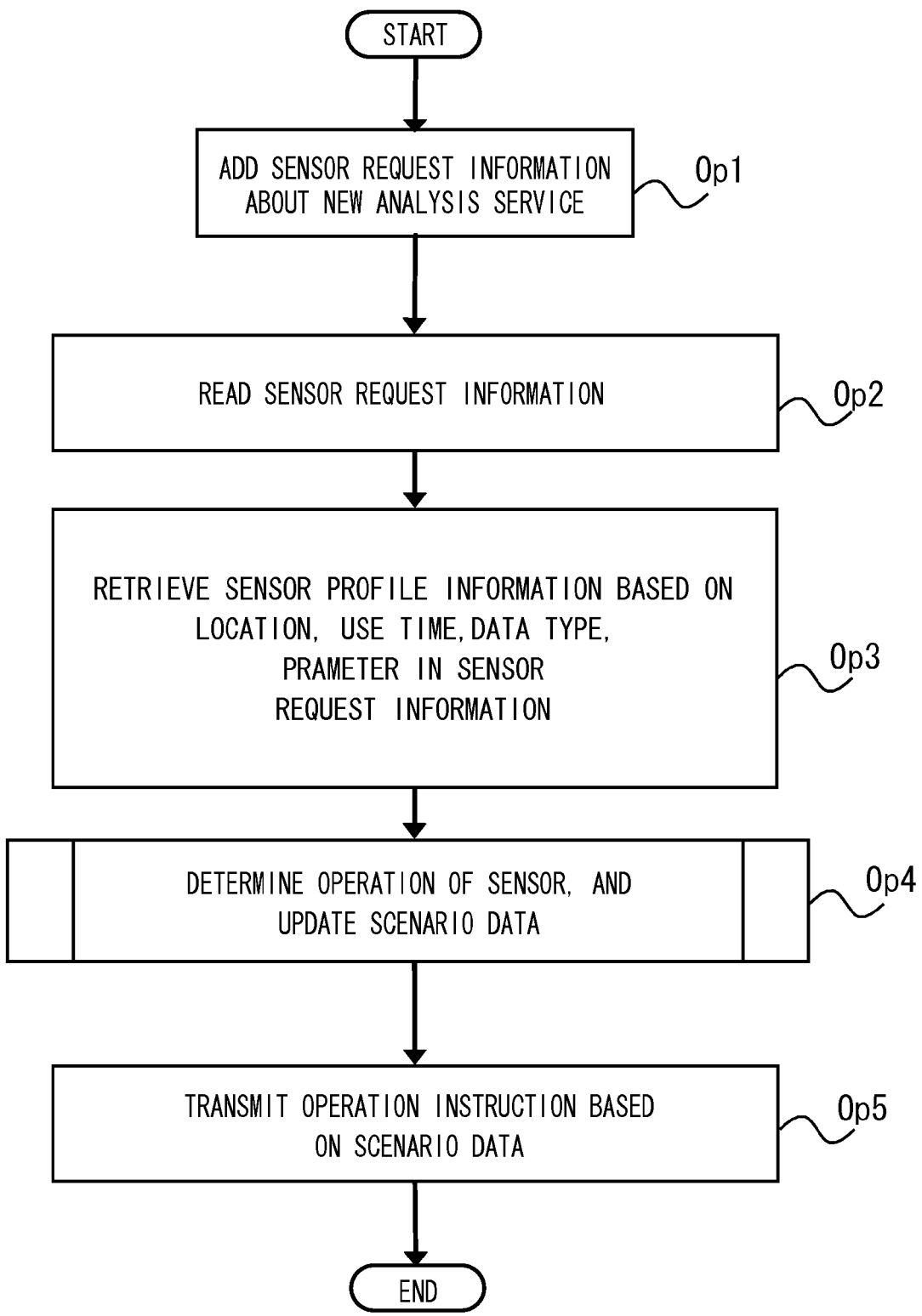
FIG. 3 is a flowchart of the flow of the process performed by the sensor information management system.

Described next is an example of an operation of the sensor information management system 1. FIG. 3 is a flowchart of the flow of the process of the sensor information management system. The process shown in FIG. 3 is performed by the sensor information management system to assign a sensor appropriate for an analysis service when the service providing unit 80a of the node computes 8a newly starts an analysis service.

First, the service providing unit 80a adds the sensor request information about an analysis service to be newly started (hereinafter referred to as an analysis service B) to the sensor request information record unit 3 (Op 1). The sensor request information about the analysis service B is generated in, for example, the node computer 8a based on the data input by a user. The service providing unit 80a of the node computer 8a transmits the generated sensor request information to the sensor information management system 1 through the network 11, and records it in the sensor request information record unit 3.

In the present embodiment, for example, assume that the analysis service B is a service for analyzing the tendency of the customers visiting a shop A using the image of the camera of the shop A. Table 1 shown below shows an example of the contents of the sensor request information about the analysis service B. The data items "location", "use time period", "data type", and "parameter" in Table 1 respectively correspond to "location", "use time period", "data type", and "parameter" shown in FIG. 2. The data contents are recorded as the data of each data item. For example, as a location, the shop name of "shop A" and the GPS longitude-latitude information (141.41, 45.24) are recorded.

TABLE 1

SENSOR REQUEST INFORMATION ABOUT ANALYSIS SERVICE B

| DATA ITEM | DATA CONTENTS |
| --- | --- |
| LOCATION | SHOP A |
|  | 141.40.45.24 |
| USE TIME PERIOD | 10:00-18:00 |
| DATA TYPE | IMAGE |
| PARAMETER | 300 FPS |

When the sensor request information about the analysis service B is added to the sensor request information record unit 3, the retrieval unit 4 reads the added sensor request information about the analysis service B from the sensor request information record unit 3 (Op 2). Then, according to the sensor request information about the analysis service B, the retrieval unit 4 retrieves the sensor profile information about the sensor corresponding to the analysis service B from the sensor profile information record unit 2 (Op 3). For example, the retrieval unit 4 compares the sensor profile information about each of the sensors 10a to 10e with the sensor request information about the analysis service B. At this time, each of the locations, the use time period, the data type, and the parameter can be compared. If the contents of the sensor request information about the analysis service B correspond to the contents of the sensor profile information in all data items, the sensor profile information is extracted from the sensor profile information record unit 2. When the contents of the sensor request information correspond to the contents of the sensor profile information in a part of data items other than in all data items, the retrieval unit 4 can extract the sensor profile information.

For example, an example of a process of the retrieval unit 4 is described below when the contents of the sensor profile information about the sensor 10*a* and the sensor 10*d* refer to the contents shown in tables 2 and 3 below.

TABLE 2

| SENSOR PROFILE INFORMATION ABOUT SENSOR 10a | |
|---|---|
| DATA ITEM | DATA CONTENTS |
| LOCATION | SHOP A |
|  | 141.40.45.24 |
| USE TIME PERIOD | WITHIN 8:00-24:00 |
| DATA TYPE | IMAGE |
| PARAMETER | 500 FPS OR LOWER |

TABLE 3

| SENSOR PROFILE INFORMATION ABOUT SENSOR 10d | |
|---|---|
| DATA ITEM | DATA CONTENTS |
| LOCATION | SHOP C |
|  | 141.39.45.19 |
| USE TIME PERIOD | 10:00-18:00 |
| DATA TYPE | POS REGISTER INFORMATION |
| PARAMETER |  |

The retrieval unit 4 compares the sensor profile information about the sensor 10*d* having the contents shown in table 3 above with the sensor request information about the analysis service B having the contents shown in table 1, and determines that the information match each other in use time period, but is different from each other in other items, that is, location, data type, and parameter.

On the other hand, the retrieval unit 4 compares the sensor profile information about the sensor 10*a* having the contents shown in table 2 with the sensor request information about the analysis service B having the contents shown in table 1, and determines that the contents of the sensor request information about the analysis service B correspond to the contents of the sensor profile information about the sensor 10*a* in each of the use time period, the data type, and the parameter. Then, the retrieval unit 4 extracts the sensor profile information about the sensor 10*a* as the sensor profile information about the sensor 10*a* corresponding to the sensor request information about the analysis service B.

Thus, the sensor profile information about the sensor appropriate for the analysis service B is extracted. That is, according to the present embodiment, the optimum set of a service and a sensor is extracted by the retrieval unit 4. The retrieval unit 4 extracts the optimum set of a service and a sensor by accessing both the sensor profile information record unit 2 for collecting and recording the sensor profile information about each of the sensors 10*a* to 10*e* in the network 11, and the sensor request information record unit 3 for collecting and recording the sensor request information about each of the service providing units 80*a* and 80*b* in the network 11. As a result, for example, the optimum sensor for the service offered by the service providing units 80*a* and 80*b* is extracted from the network 11, and the function can be dynamically assigned. In this example, described below is the case where the sensor profile information about the camera of the sensor 10*a* is extracted. The process of extracting the sensor profile information is only an example, and the process is not limited to this example.

The retrieval unit 4 notifies the scenario generation unit 5 of the retrieved sensor profile information about the sensor 10*a* and the sensor request information about the analysis service B. The scenario generation unit 5 determines the operation of the sensor 10*a* to provide the analysis service B with data according to the notified sensor profile information and sensor request information, and updates the scenario data such that the determined operation can be included in the scenario data of the sensor 10*a* recorded in the scenario record unit 12 (Op 4). The scenario management unit 6 transmits an operation instruction to the sensor control unit of the corresponding sensor so that the operation indicated by the recorded scenario data can be performed (Op 5).

An Example of Scenario Generating Process

Figure 4:
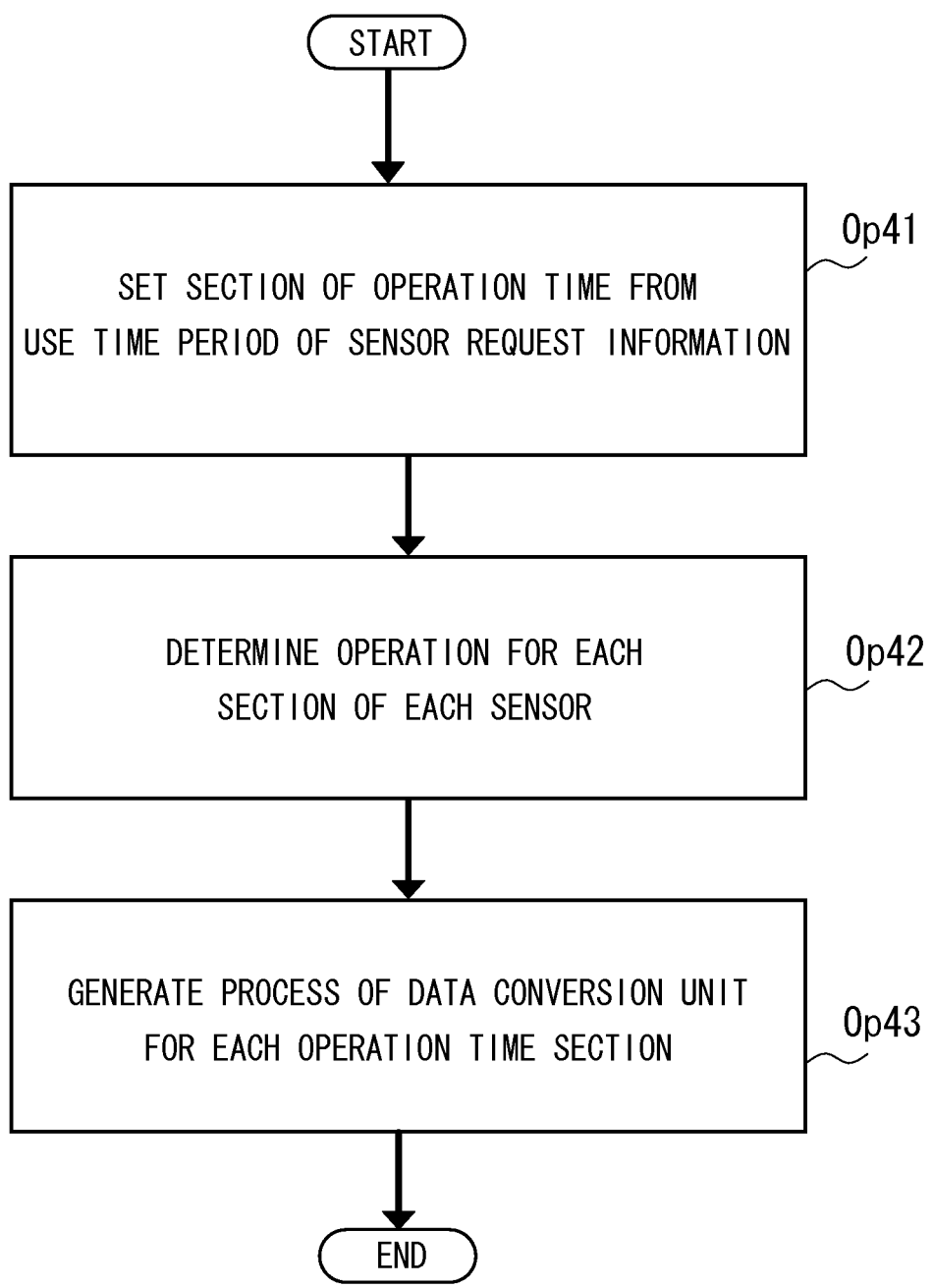
FIG. 4 is a flowchart of the process of generating a scenario.

Described below in detail is the scenario data updating process in Op 4. FIG. 4 is a flowchart of the process of the scenario generation unit 5 generating a scenario. Also described below is the case in which when the sensor 10*a* is operating for another service (hereinafter referred to as a service A) offered by the service providing unit 80*a*, the sensor 10*a* is allowed to perform the operation for the above-mentioned analysis service B in addition to the operation for the service A. Table 4 shows the data contents of the sensor request information about the service A.

TABLE 4

| SENSOR REQUEST INFORMATION ABOUT SERVICE A | |
|---|---|
| DATA ITEM | DATA CONTENTS |
| LOCATION | SHOP A |
|  | 141.40.45.24 |
| USE TIME PERIOD | 8:00 TO 12:00 |
| DATA TYPE | IMAGE |
| PARAMETER | 100 FPS |

In this case, the scenario record unit 12 records the scenario data indicating the operation of the sensor 10*a* for the service A. Then, the scenario generation unit 5 adds the data indicating the operation of the sensor 10*a* for the analysis service B to the recorded scenario data indicating the operation of the sensor 10*a*.

Figure 5:
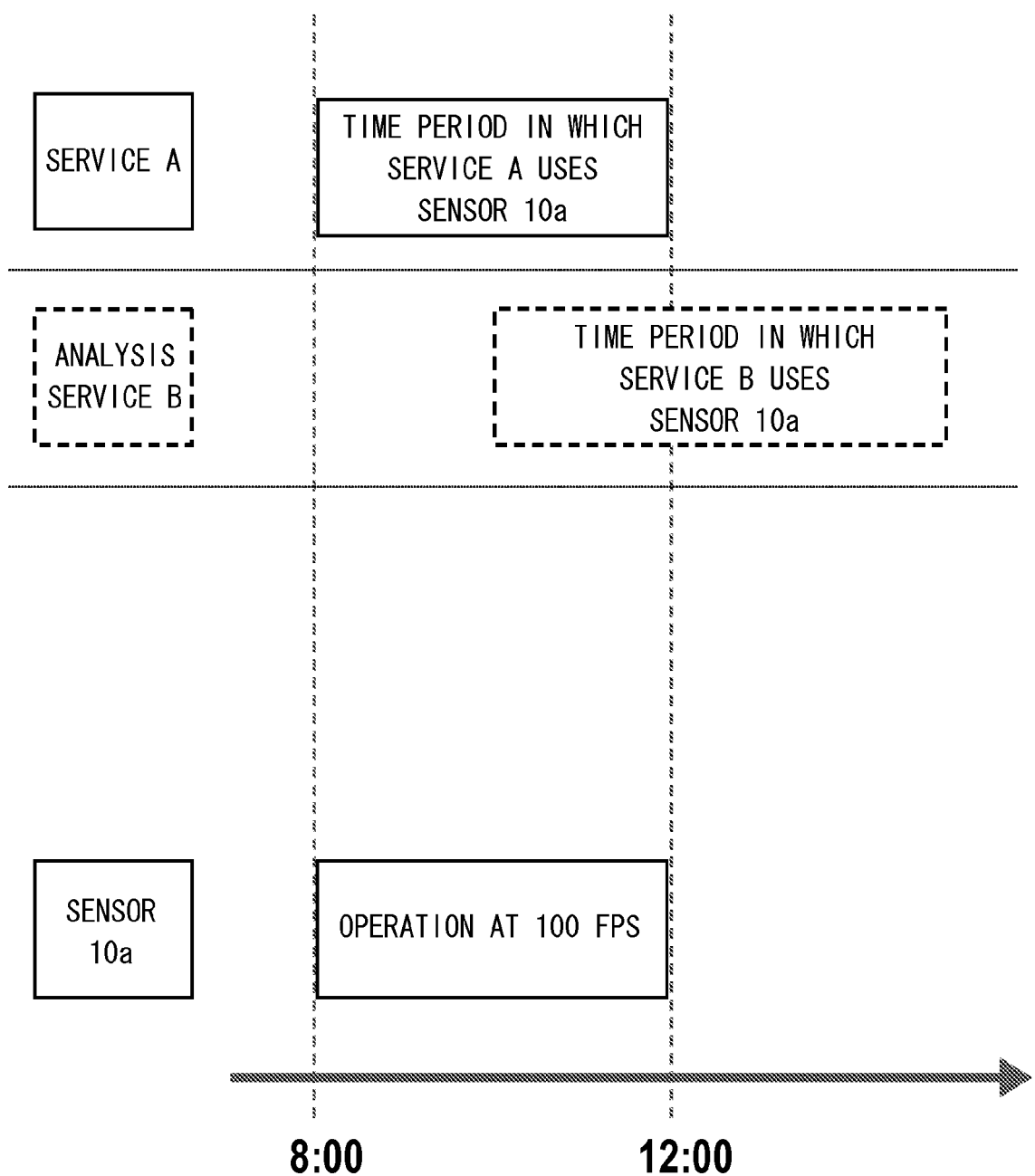
FIG. 5 is an explanatory view of the relationship between the operation schedule of a sensor and the process schedules of a service A and an analysis service B.

FIG. 5 is an explanatory view showing the relationship between the operation schedules of the sensor 10*a* indicated by the scenario data and the process schedules of the services A and B. In FIG. 5, the arrow indicates a time axis. As shown in FIG. 5, the service A uses the image data of the 100 FPS presented by the sensor 10*a* from 8:00 to 12:00. In this process, the sensor 10*a* operates to present images at 100 FPS from 8:00 to 12:00 as shown in FIG. 5. In this case, the recorded scenario data of the sensor 10*a* includes, for example, the data indicating the time to start the operation (8:00) and the time to end the operation (12:00), and the operation parameter (100 FPS) of the sensor 10*a*. The operation parameter is to control the operation of the sensor 10*a*. In the present embodiment, for example, the operation parameter of the sensor 10*a* is a sampling frequency of an image.

Figure 6:
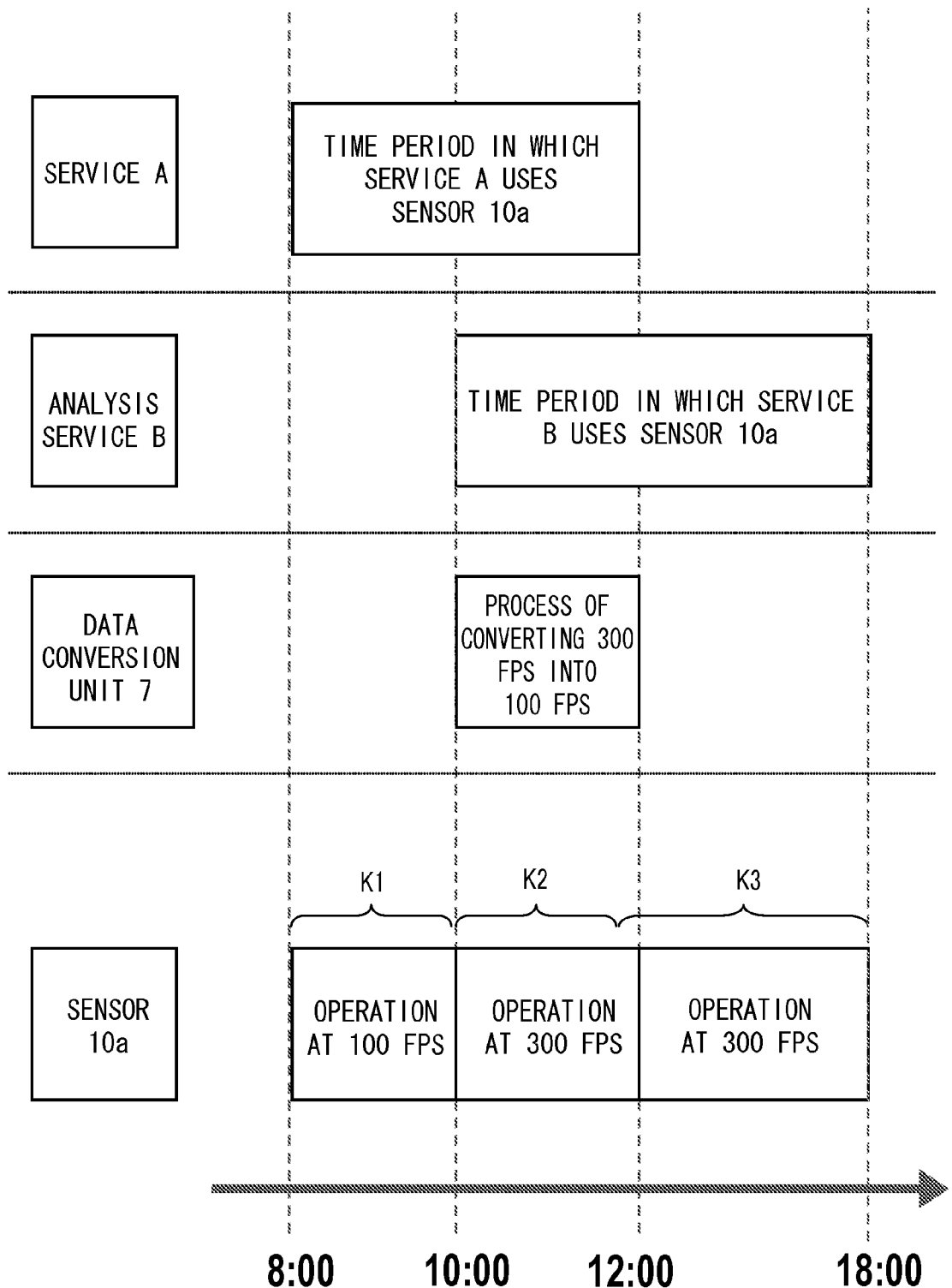
FIG. 6 is an explanatory view of the operation schedules of the sensor and the data conversion unit after the analysis service B is added.

The time in which data presented by the sensor 10*a* can be used in the newly added analysis service B is 10:00 to 18:00 (refer to the portion indicated by dotted lines shown in FIG. 5). In this case, the scenario generation unit 5 sets a plurality of sections for the operation time of the sensor 10*a* according to the sensor request information (OP 41 shown in FIG. 4). Since the time period in which the analysis service B uses the data of the sensor 10*a* is 10:00 to 18:00, the sections are set with respect to the current operation starting time 8:00 and ending time 12:00 of the sensor 10*a*, the use starting time 10:00 and ending time 18:00 of the analysis service B. As a result, as shown in FIG. 6, a section K1 (8:00 to 10:00), a section K2 (10:00 to 12:00), and a section K3 (12:00 to 18:00) are set for the operation time of the sensor 10a. Practically, the scenario generation unit 5 adds the information about the sections K1, K2, and K3 to the scenario data of the sensor 10a. FIG. 6 is an explanatory view of the operation schedule of the sensor 10a and the data conversion unit 7 when the analysis service B is added.

When the scenario generation unit 5 sets the sections, it determines the operation of the sensor 10a for each section (Op 42 shown in FIG. 4). Practically, the scenario generation unit 5 refers to the sensor request information about the service A and the analysis service B, and the sensor profile information about the sensor 10a for each section, generates an operation parameter indicating the operation of the sensor 10a for each section, and adds the parameters to the scenario data of the sensor 10a.

For example, in determining the section K1 (8:00 to 10:00), the section is not included in the use time period (10:00 to 18:00, refer to table 1 above) of the sensor request information about the analysis service B, but is included only in the use time period (8:00 to 12:00, refer to table 4) of the sensor request information about the service A. Therefore, the parameter "100 FPS" of the sensor request information about the service A is generated as an operation parameter of the section K1.

The section K2 (10:00 to 12:00) overlaps the use time period (8:00 to 12:00) of the sensor request information about the service A and the use time period (10:00 to 18:00) of the sensor request information about the analysis service B. The parameter requested by the service A is "100 FPS", the parameter requested by the analysis service B is "300 FPS". In this case, the scenario generation unit 5 prioritizes the higher specification, and can set the operation parameter of the section K2 as "300 FPS".

The section K3 (12:00 to 18:00) is only the use time period of the sensor request information about the analysis service B. Since the parameter requested by the analysis service B is "300 FPS", the scenario generation unit 5 sets the operation parameter of the section K3 as "300 FPS" continuously after the section K2.

Thus, the scenario generation unit 5 can correctly satisfy the request of the service side by determining the operation according to the request of the highest specification in each section. The scenario generation unit 5 generates an operation parameter in a range corresponding to the parameter "500 FPS or less" (refer to table 2) of the sensor profile information about the sensor 10a.

When the operation of each section is determined in this way, the scenario generation unit 5 next generates the data indicating the process of converting the data provided by the sensor 10a into the data used in a service with respect to the section where the attribute of the data provided by the sensor 10a is different from the attribute of the data used in the service (Op 43). The process is performed by the data conversion unit 7. For example, in the section K2, the sampling frequency of the image data provided by the sensor 10a is "300 FPS" while that of the image data requested by the service A is "100 FPS". Therefore, in the section K2, the scenario generation unit 5 generates the data indicating the process of converting the image data provided by the sensor 10a for the service A from "300 FPS" to "100 FPS". The generated data is added to, for example, the scenario data of the sensor 10a.

In the above-mentioned processes (Op 41 to Op 43), the operation schedules of the data conversion unit 7 and the sensor 10a indicated by the scenario data of the sensor 10a are shown in FIG. 6. That is, the sensor 10a operates to provide the service A with the image data at the sampling frequency of "100 FPS" in the section K1, to provide the service A and the analysis service B with the image data at the sampling frequency of "300 FPS" in the section K2, and to provide the service A with the image data at the sampling frequency of "100 FPS" in the section K3. The data conversion unit 7 converts the sampling frequency of the image data provided by the sensor 10a in the section K2 from the "300 FPS" to "100 FPS", and then provides the data for the service A.

Figure 7:
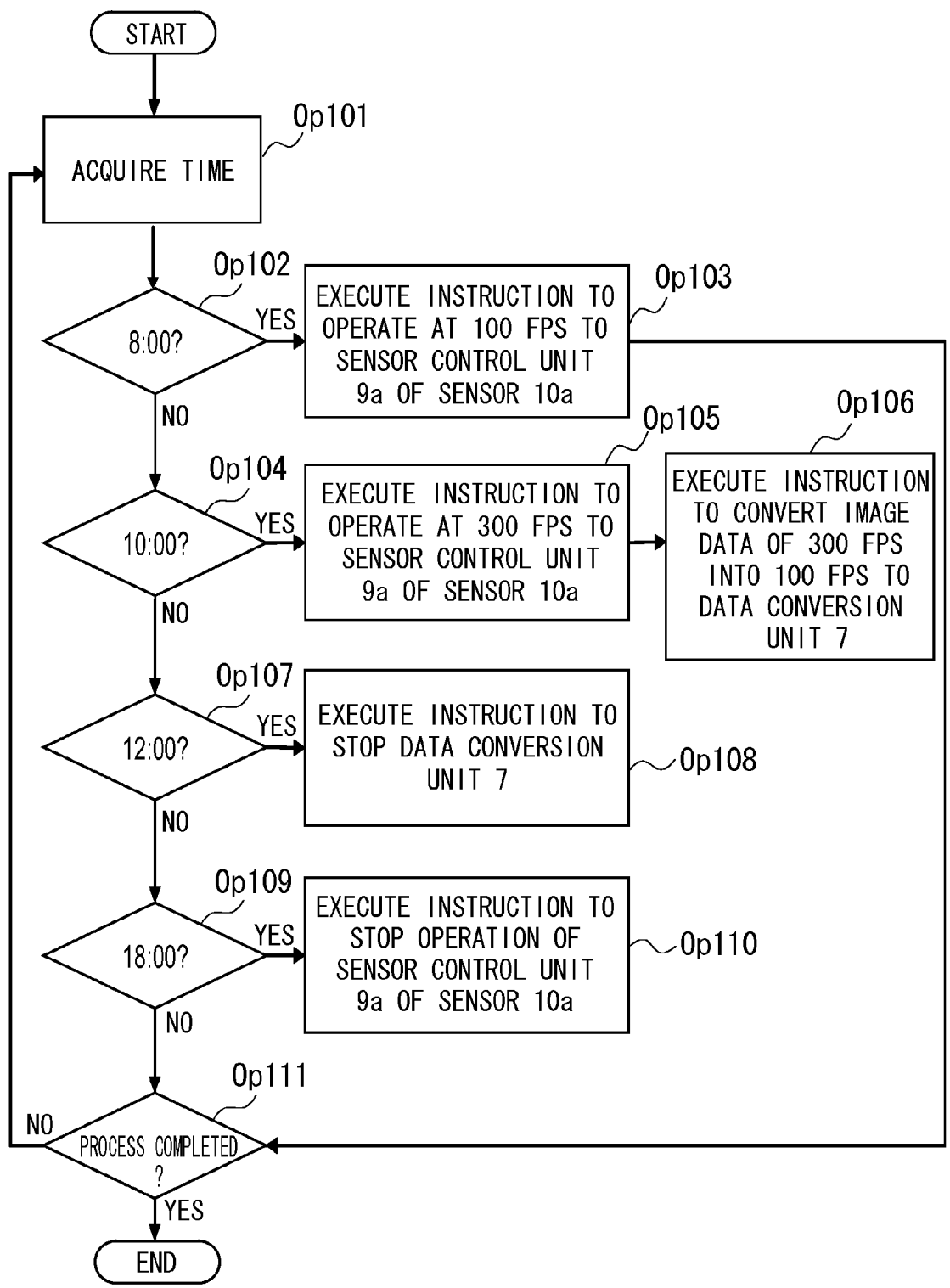
FIG. 7 is a flowchart of the flow of the process indicated by scenario data.

FIG. 7 is a flowchart of the flow of the process indicated by the scenario data of the sensor 10a generated in the processes in Op 41 to Op 43. That is, the scenario management unit 6 performs the process shown in FIG. 7 based on the scenario data generated in the processes in Op 41 to Op 42. Thus, the sensor 10a and the data conversion unit 7 operate on the schedules shown in FIG. 6.

In the example above, the process of converting the sampling frequency is described as a process performed by the data conversion unit 7, but the data converting process is not limited to this process. The data converting process includes the process of converting data provided by a sensor and data requested in a service when the data are different from each other in data format, unit, etc. so that the data can match each other. Another example of the process performed by the data conversion unit 7 can be a change in sampling frequency, a conversion of the quality of an image and sound, a change in leveling by a moving average.

The scenario data indicating the process shown in FIG. 7 can be, for example, recorded in the scenario record unit 12 in the script format including the data indicating the process to be executed by the scenario management unit 6 and the execution time, or can be recorded using a source code of any programming language, an XML format, using an object code, in a binary data format, etc. That is, the representation format of the scenario data is not limited to a specific format so far as the data can be read by the scenario management unit 6, and the process shown in FIG. 7 can be performed.

Example of Operation of Scenario Management Unit 6

Described below is an example of an operation when the scenario management unit 6 performs the process shown in FIG. 7 based on the scenario data. In the process shown in FIG. 7, the scenario management unit 6 first acquires the current time (Op 101). If the current time is "8:00" (YES in Op 102), the scenario management unit 6 transmits to the sensor control unit 9a of the sensor 10a an instruction to start the operation of providing the image data of the sampling frequency of "100 FPS" (Op 103). In the instruction, the scenario management unit 6 can specify the service providing unit 80a for offering the service A as the destination of the image data, or specify the scenario management unit 6 as a destination. When the scenario management unit 6 is specified as a destination, it is necessary for the scenario management unit 6 to transfer image data to the service providing unit 80a.

If the current time is "10:00" (YES in Op 104), the scenario management unit 6 transmits to the sensor control unit 9a of the sensor 10a an instruction to start the operation of providing image data at the sampling frequency of "300 FPS" (Op 105). Furthermore, the scenario management unit 6 transmits to the data conversion unit 7 to convert the sampling frequency of the image data provided by the sensor 10a from "300 FPS" to "100 FPS", and transmits the data to the service providing unit 80a for offering the service A (Op 106).

If the current time is "12:00" (YES in Op 107), the scenario management unit 6 transmits to the data conversion unit 7 an instruction to stop the converting process (Op 108).

If the current time is "18:00" (YES in Op 109), the scenario management unit 6 transmits to the sensor control unit 9a of the sensor 10a an instruction to stop the operation of providing image data (Op 110).

The scenario management unit 6 repeats the above-mentioned processes until all processes in Op 103, Op 105, Op 106, Op 108, and Op 110 are completed (YES in Op 111). Thus, the sensor 10a efficiently provides the image data used in the service A and analysis service B performed by the service providing unit 80a with appropriate timing.

Example of Other Operations by Sensor Information Management System

Described next are other examples of the process of generating a scenario. In one example, when the sensor 10b is operating for another service (hereinafter referred to as a service D) performed by the service providing unit 80b of the node computer 8b, the sensor 10b and the sensor 10e are allowed to perform an operation for a service to be newly started (hereinafter referred to as a service C) by the service providing unit 80a of the node computer 8a in addition to the operation for the service D.

For an example, the sensor 10b is a camera mounted in the shop B, and has the function of providing the movements of the people in the shop B as flow line information from the captured image data. In addition, the sensor 10e is a CGM sensor for generating and providing the reputation information about the shop B by analyzing the Web log of the Web server (not shown in the attached drawings).

In the present embodiment, the sensor request information about the executed service D is shown in table 5. That is, the service D uses the flow line information about the shop B provided by the sensor 10b at 8:00 to 18:00.

TABLE 5

| SENSOR REQUEST INFORMATION ABOUT SERVICE D | |
| --- | --- |
| DATA ITEM | DATA CONTENTS |
| LOCATION | SHOP B |
|  | (141.35.45.20) |
| USE TIME PERIOD | 8:00 TO 18:00 |
| DATA TYPE | FLOW LINE INFORMATION |

The sensor request information about the service C to be newly added is shown in table 6. That is, the sensor request information about the service C includes the data "request 1" for requesting the flow line information about the shop B, and the data "request 2" for requesting the reputation information about the shop B. That is, the service C requires the flow line information about the shop B at 10:00 to 15:00 and the reputation information about the shop B. The service C acquires the flow line information about the customers in the shop B from the sensor 10b, acquires the reputation information in the Web about the shop B from the sensor 10e, and analyzes the relationship between these pieces of information, thereby analyzing the relationship between the information in the Web and the behavior of the customers in an actual shop.

TABLE 6

| SENSOR REQUEST INFORMATION ABOUT SERVICE C | | |
| --- | --- | --- |
| | DATA ITEM | DATA CONTENTS |
| REQUEST 1 | LOCATION | SHOP B |
| | | (141.35.45.20) |
| | USE TIME PERIOD | 10:00 TO 15:00 |
| | DATA TYPE | FLOW LINE INFORMATION |
| REQUEST 2 | LOCATION | WEB SERVER |
| | USE TIME PERIOD | 10:00 TO 15:00 |
| | DATA TYPE | REPUTATION INFORMATION |
| | PARAMETER | SHOP B |

When the retrieval unit 4 retrieves, for example, the sensor profile information about the sensor corresponding to the sensor request information as the contents of the table 6, the retrieval unit 4 extracts the sensor profile information at each of the requests 1 and 2. Thus, for example, the retrieval unit 4 extracts the sensor profile information about the sensor 10b as the contents of the table 7 at the request 1. In addition, at the request 2, the sensor profile information about the sensor 10e as the contents shown in table 8 can be extracted. In this case, both the sensor profile information about the sensor 10b and the sensor profile information about the sensor 10e are extracted as the sensor profile information about the sensors appropriate for the service C.

TABLE 7

| SENSOR PROFILE INFORMATION ABOUT SENSOR 10b | |
| --- | --- |
| DATA ITEM | DATA CONTENTS |
| LOCATION | SHOP B |
|  | (141.39.45.20) |
| USE TIME PERIOD | 8:00 TO 24:00 |
| DATA TYPE | FLOW LINE INFORMATION |

TABLE 8

| SENSOR PROFILE INFORMATION ABOUT SENSOR 10e | |
| --- | --- |
| DATA ITEM | DATA CONTENTS |
| LOCATION | WEB SERVER |
| USE TIME PERIOD | 0:00 TO 24:00 |
| DATA TYPE | ACCESS FREQUENCY |
|  | REPUTATION INFORMATION |
| PARAMETER | SHOP A |
|  | SHOP B |

Thus, in this way the retrieval unit 4 can extract the sensor profile information about a plurality of sensors for one service. Thus, the service of processing data provided by a plurality of sensors can be assigned a plurality of appropriate functions.

Figure 8:
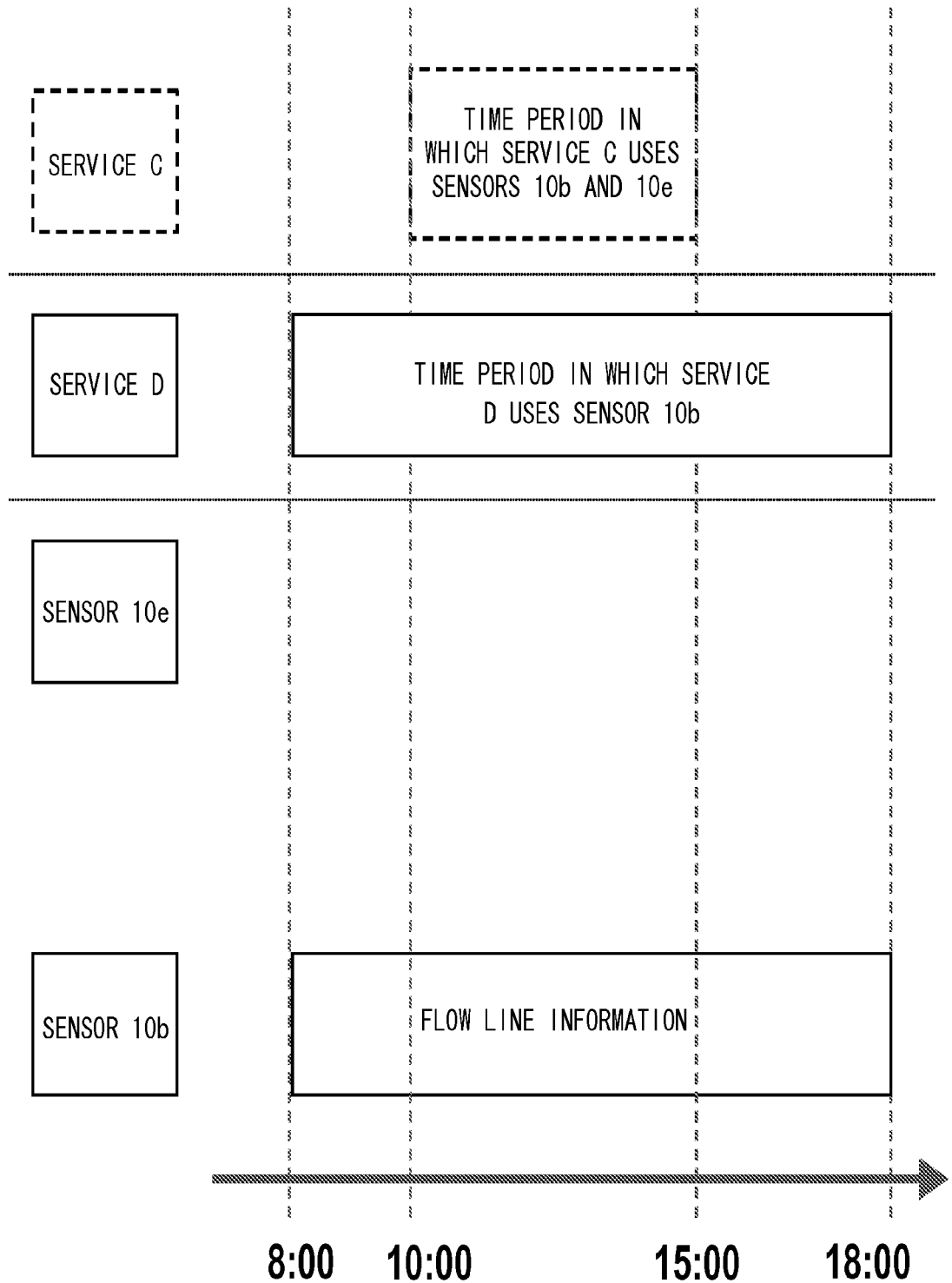
FIG. 8 is an explanatory view of the relationship between the operation schedule of the sensor before the service C is added and the process schedule of the services C and D.

FIG. 8 is an explanatory view showing the relationship between the operation schedule of the sensor 10b before the service C is added and the process schedule of the services C and D. In FIG. 8, the arrow shows a time axis. As shown in FIG. 8, the service D uses the flow line information provided from the sensor 10b from 8:00 to 18:00. In this case, the scenario record unit 12 records the scenario data of the sensor 10b, and the scenario data of the sensor 10b includes, for example, the data indicating the operation starting time (8:00) and the operation ending time (18:00), and the operation parameter "flow line information" about the sensor 10b. The time in which the service C to be newly added uses the data provided by the sensor 10b and the data provided by the sensor 10e is 10:00 to 15:00 (refer to the portion indicated by the dotted lines shown in FIG. 8).

The scenario generation unit 5 first sets the periods sectioned by the time points of 8:00, 10:00, 15:00, and 18:00 for the operation time of each of the sensor 10b and the sensor 10e.

Figure 9:
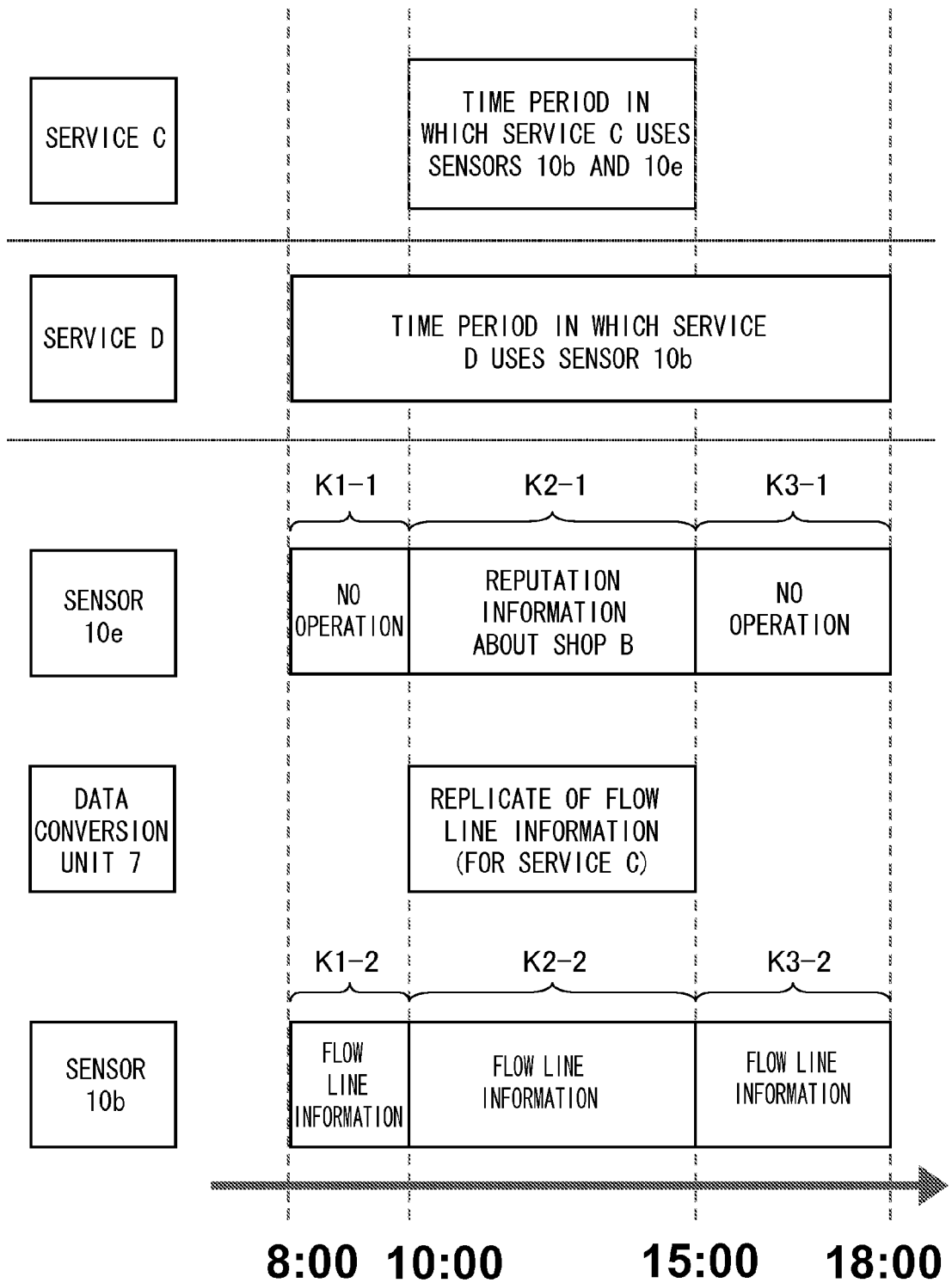
FIG. 9 is an explanatory view of the operation schedules of the sensor and the data conversion unit after the service C is added.

The scenario generation unit 5 sets the section K1-1, the section K2-1, and the section K3-1 as the operation time of the sensor 10e as shown in FIG. 9, and sets the section K1-2, the section K2-2, and the section K3-2 as the operation time of the sensor 10b. FIG. 9 is an explanatory view of the operation schedules of the sensor 10b, the sensor 10e, and the data conversion unit 7 after the service C is added.

The scenario generation unit 5 determines the operation of the sensor 10b or 10e in each section. Practically, the scenario generation unit 5 generates an operation parameter indicating the operation of the sensor 10e for each section by referring to the contents of the "request 2" in the sensor request information about the service C and the sensor profile information about the sensor 10e with respect to the sections K1-1, K2-1, and K3-1 of the sensor 10e, and adds the data to the scenario data of the sensor 10a.

For example, since the time period (8:00-10:00) of the section K1-1 and the time period (15:00 to 18:00) of the section K3-1 are not included in the use time period (10:00 to 15:00, refer to the table 6 above) of the sensor request information about the service C, an operation parameter indicating "no operation" is generated.

For the section K2-1 (10:00 to 15:00), the scenario generation unit 5 can generate as an operation parameter the data "reputation information" and "shop B" indicated by the data type and the parameter of the "request 2" in the sensor request information about the service C.

For the sections K1-2, K2-2, and K2-3, the scenario generation unit 5 refers to the contents of the "request 1" in the sensor request information about the service D and the sensor request information about the service C, and the sensor profile information about the sensor 10e, and can determine the operation of the sensor 10b for each section. For example, for the section K2-2, the scenario generation unit 5 refers to the data type of the sensor request information about the service D and the data type of the sensor request information "request 1" about the service C, generates an operation parameter indicating the contents "flow line information" about both pieces of information, and adds the parameter to the scenario data of the sensor 10b.

Furthermore, for the section K2-2 in which the data (flow line information) provided by the sensor 10b is used in both services D and C, the scenario generation unit 5 generates data indicating the process of replicating the flow line information provided by the sensor 10a for the service C. The generated data is added to the scenario data as the process to be performed by the data conversion unit 7. Thus, the scenario data of the sensor 10e is the data including the information for executing the operation schedule shown in FIG. 9.

Figure 10:
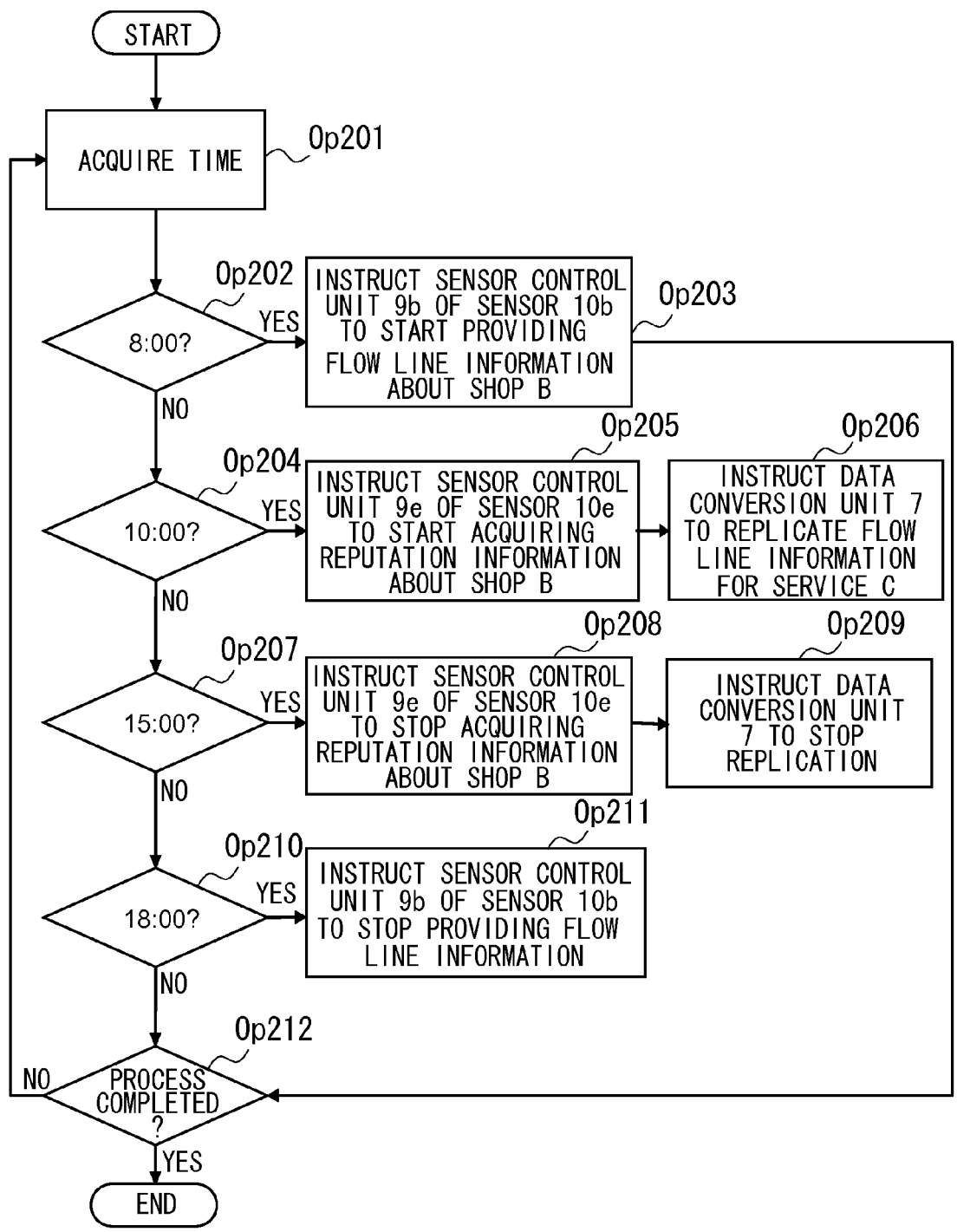
FIG. 10 is a flowchart of the flow of the process indicated by scenario data.

FIG. 10 is a flowchart of the flow of the process indicated by the scenario data of the sensor 10b generated in the above-mentioned processes. That is, the scenario management unit 6 performs the processes shown in FIG. 10 based on the scenario data generated in the process of the scenario generation unit 5. Thus, the sensor 10b, the sensor 10e, and the data conversion unit 7 operate on the operation schedule shown in FIG. 9.

Examples of Other Operations of Scenario Management Unit 6

Described below is an example of the operation performed when the scenario management unit 6 performs the process shown in FIG. 10 based on the scenario data. First, the scenario management unit 6 acquires the current time (Op 201). When the current time is "8:00" (YES in Op 202), the scenario management unit 6 transmits to the sensor control unit 9b of the sensor 10b an instruction to start the operation of providing "flow line information" (Op 203).

When the current time is "10:00" (YES in Op 204), the scenario management unit 6 transmits to the sensor control unit 9e of the sensor 10e an instruction to start the operation of providing the "reputation information" about the "shop B" (Op 205). Furthermore, the scenario management unit 6 transmits to the data conversion unit 7 an instruction to replicate the flow line information provided by the sensor 10b, and transmit the information to the service providing unit 80a for offering the service C (Op 206).

When the current time is "15:00" (YES in Op 207), the scenario management unit 6 transmits to the sensor control unit 9e of the sensor 10e an instruction to stop the operation of providing the "reputation information" (Op 208). Furthermore, the scenario management unit 6 transmits to the data conversion unit 7 an instruction to stop the replicating process (Op 209).

When the current time is "18:00" (YES in Op 210), the scenario management unit 6 transmits to the sensor control unit 9b of the sensor 10b an instruction to stop the operation of providing the "flow line information" (Op 211).

The scenario management unit 6 repeats the above-mentioned processes until all processes in Op 203, Op 205, Op 206, Op 208, Op 209, and Op 211 are completed (YES in Op 212). Thus, the sensor 10b efficiently provides the flow line information used in the service C and the service D offered by the service providing unit 80a, and the sensor 10e provides the reputation information used in the service C with appropriate timing. In addition, in the example of the operation above, the analysis service can be easily realized using data from both the camera mounted in the shop and the Web server to which the information about the shop is transmitted. That is, the data obtained from the sensor for detecting physical or chemical events, and the data obtained from the sensor for detecting the events indicated by the information generated in the information processing, can be acquired easily. As a result, a high-level analysis service can be provided.

An embodiment of the present invention is described above, but the scope of the application of the present invention is not limited to the embodiment above. Other examples of data provided by the sensor for detecting a physical or chemical event are the data obtained by measurements of a living body (data indicating eyeball movements, repulsion system, electromyogram, etc.), motion capturing data, acceleration data, CPU load, GPS data, etc. Other examples of data provided by the sensor for detecting an event indicated by the information generated in the information processing are the data indicating the pattern of Web access, the data indicating the advertising effect of a Web site, the data indicating the tendency of an inputting operation by a user, the amount of communication packets, the number of transactions, etc.

The service using a sensor according to the present invention is not limited to the above-mentioned service A, analysis service B, service C, or service D. For example, they can be a service of monitoring the condition of the location of a sensor, a communication service of transmitting various types of information through a sensor, and any other optional services.

In the above-mentioned embodiment, the sensor information management system 1 is realized by a computer. However, a program for realizing the function of the sensor information management system 1 using a computer or a recording medium for storing the program is also an embodiment of the present invention.

As described above, the present invention is effective as a sensor information management system capable of efficiently using a sensor connected to a network.

According to the present invention, data provided by a plurality of sensors can be efficiently used in the entire network to which a plurality of sensors are connected.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sensor information management system connected to a network including a plurality of sensors and a computer that provides services using data presented by at least one of the plurality of sensors, comprising:
   first memory configured to store sensor profile information representing for each of items the information about each of the plurality of sensors;
   second memory configured to store sensor request information representing for each of the items, the sensor request information including data requested from the computer to a sensor to offer the service;
   a third memory configured to store scenario data representing the operation of at least a part of the plurality of sensors; and
   a processor configured to execute a process including:
   extracting data representing a set of a service and a sensor for presenting the data requested to offer the service by comparing at least a part of the items of the sensor profile information with a corresponding item of the sensor request information;
   determining an operation for allowing the sensor to present the data requested to offer the service with respect to the set of the service and the sensor represented by the data extracted by the extracting based on the sensor profile information and the sensor request information, and recording the scenario data including the operation for representing the operation of the sensor in the third memory;
   generating a control signal for allowing each sensor to perform the operation of each sensor represented by the scenario data recorded in the third memory, and transmitting the generated signal to the each sensor; and
   converting data provided by the sensor into data requested by the service with respect to the set of the service and the sensor extracted by the extracting.

2. The sensor information management system according to claim 1, wherein:
   an item of the sensor profile information comprises at least one of pieces of the information relating to a site of a sensor, a time in which the sensor can be used, and data provided by the sensor;
   an item of the sensor request information comprises at least one of pieces of the information relating to a site of a sensor, a time in which the sensor is to be used, data to be acquired from the sensor;
   the extracting extracts a set of the sensor and the service by comparing relating to at least one piece of information between a site of a sensor of the sensor profile information and a site of a sensor of the sensor request information, between a time in which the sensor of the sensor profile information and a time in which the sensor of the sensor request information is to be used, and between information about data provided by the sensor of the sensor profile information and information about data provided by the sensor of the sensor request information.

3. The sensor information management system according to claim 1, wherein
   an item of the sensor profile information is the information about the data provided by the sensor;
   an item of the sensor request information includes the information about data to be acquired from the sensor; and
   the recording includes the data indicating in the scenario data an operation of converting the data provided by the sensor into the data requested by the service as data indicating the operation of the converting when the data provided by the sensor indicating the sensor profile information does not match the data to be acquired from the sensor indicated by the sensor request information with respect to the set of the service and the sensor extracted by the extracting.

4. A sensor information management method executed by a computer communicating with another computer including a plurality of sensors and that provides services using data presented by at least one of the plurality of sensors, comprising:
   recording in a first memory the information about each of the plurality of sensors as sensor profile information representing each of items;
   recording in a second memory the information about data requested from the another computer to the sensor, as sensor request information representing each of the items, to offer the service;
   recording in a third memory the scenario data indicating the operation of at least a part of the plurality of sensors;
   extracting data indicating a set of a service and a sensor for providing data requested to provide the service by comparing at least a part of items of the sensor profile information with a corresponding item in the sensor request information;
   determining an operation of the sensor providing data requested to offer the service with respect to the set of the service and the sensor indicated by the extracted data based on the sensor profile information and the sensor request information;
   recording in the third memory the determined operation of the sensor included in the scenario data;
   generating a control signal for allowing each of the sensors to perform an operation of each sensor indicated by the scenario data recorded in the third memory, and transmitting the control signal to each sensor; and
   converting data provided by the sensor into data requested by the service with respect to the set of the service and the sensor.

5. A non-transitory computer-readable storage medium storing an information management program for causing a computer to communicate with another computer including a plurality of sensors and that provides services using data presented by at least one of the plurality of sensors, the program causing the computer to perform the process comprising:
   recording in a first memory the information about each of the plurality of sensors as sensor profile information representing each of the items;
   recording in a second memory the information about data requested from the another computer to the sensor, as sensor request information representing each of the items, to offer the service;

recording in a third memory the scenario data indicating the operation of at least a part of the plurality of sensors;

extracting data indicating a set of a service and a sensor for providing data requested to provide the service by comparing at least a part of items of the sensor profile information with a corresponding item in the sensor request information;

determining an operation of the sensor providing data requested to offer the service with respect to the set of the service and the sensor indicated by the extracted data based on the sensor profile information and the sensor request information, and recording in the third memory the determined operation of the sensor included in the scenario data;

generating a control signal for allowing each of the sensors to perform an operation of each sensor indicated by the scenario data recorded in the third memory, and transmitting the control signal to each sensor; and converting data provided by the sensor into data requested by the service with respect to the set of the service.

6. The sensor information management method according to claim 4, wherein:

an item of the sensor profile information comprises at least one of pieces of the information relating to a site of a sensor, a time in which the sensor can be used, and data provided by the sensor;

an item of the sensor request information comprises at least one of pieces of the information relating to a site of a sensor, a time in which the sensor is to be used, data to be acquired from the sensor;

the extracting extracts a set of the sensor and the service by comparing relating to at least one piece of information between a site of a sensor of the sensor profile information and a site of a sensor of the sensor request information, between a time in which the sensor of the sensor profile information and a time in which the sensor of the sensor request information is to be used, and between information about data provided by the sensor of the sensor profile information and information about data provided by the sensor of the sensor request information.

7. The sensor information management method according to claim 4, wherein:

an item of the sensor profile information is the information about the data provided by the sensor;

an item of the sensor request information includes the information about data to be acquired from the sensor; and the recording includes the data indicating in the scenario data an operation of converting the data provided by the sensor into the data requested by the service as data indicating the operation of the converting when the data provided by the sensor indicating the sensor profile information does not match the data to be acquired from the sensor indicated by the sensor request information with respect to the set of the service and the sensor extracted by the extracting.

8. The non-transitory computer-readable storage medium according to claim 5, wherein:

an item of the sensor profile information comprises at least one of pieces of the information relating to a site of a sensor, a time in which the sensor can be used, and data provided by the sensor;

an item of the sensor request information comprises at least one of pieces of the information relating to a site of a sensor, a time in which the sensor is to be used, data to be acquired from the sensor;

the extracting extracts a set of the sensor and the service by comparing relating to at least one piece of information between a site of a sensor of the sensor profile information and a site of a sensor of the sensor request information, between a time in which the sensor of the sensor profile information and a time in which the sensor of the sensor request information is to be used, and between information about data provided by the sensor of the sensor profile information and information about data provided by the sensor of the sensor request information.

9. The non-transitory computer-readable storage medium according to claim 5, wherein:

an item of the sensor profile information is the information about the data provided by the sensor;

an item of the sensor request information includes the information about data to be acquired from the sensor; and the recording includes the data indicating in the scenario data an operation of converting the data provided by the sensor into the data requested by the service as data indicating the operation of the converting when the data provided by the sensor indicating the sensor profile information does not match the data to be acquired from the sensor indicated by the sensor request information with respect to the set of the service and the sensor extracted by the extracting.

* * * * *